(12) United States Patent
Mears et al.

(10) Patent No.: US 8,225,342 B2
(45) Date of Patent: Jul. 17, 2012

(54) METHODS AND APPARATUS TO COLLECT AUDIENCE INFORMATION ASSOCIATED WITH A MEDIA PRESENTATION

(75) Inventors: Paul M. Mears, Safety Harbor, FL (US); Arun Ramaswamy, Tampa, FL (US); Venugopal Srinivasan, Palm Harbor, FL (US); Dan Nelson, Tampa, FL (US); Kevin K. Deng, Safety Harbor, FL (US); John Peiffer, New Port Richey, FL (US)

(73) Assignee: The Nielsen Company (US), LLC., Schaumburg, IL (US)

( * ) Notice: Subject to any disclaimer, the term of this patent is extended or adjusted under 35 U.S.C. 154(b) by 2080 days.

(21) Appl. No.: 10/970,585

(22) Filed: Oct. 21, 2004

(65) Prior Publication Data

US 2005/0144632 A1 Jun. 30, 2005

Related U.S. Application Data

(63) Continuation of application No. PCT/US03/12371, filed on Apr. 21, 2003.

(60) Provisional application No. 60/374,130, filed on Apr. 22, 2002.

(51) Int. Cl.
*H04H 60/33* (2008.01)
(52) U.S. Cl. .................. 725/9; 725/16; 725/20
(58) Field of Classification Search ............... 725/9, 20, 725/16
See application file for complete search history.

(56) References Cited

U.S. PATENT DOCUMENTS

| | | | |
|---|---|---|---|
| 4,626,904 A | 12/1986 | Lurie | |
| 4,695,879 A | 9/1987 | Weinblatt | |
| 4,930,011 A | 5/1990 | Kiewit | |
| 5,483,276 A | 1/1996 | Brooks et al. | |
| 5,497,185 A | 3/1996 | Dufresne et al. | |
| 5,737,026 A * | 4/1998 | Lu et al. | 348/473 |
| 6,353,929 B1 * | 3/2002 | Houston | 725/20 |
| 6,467,089 B1 | 10/2002 | Aust et al. | |
| 6,563,423 B2 | 5/2003 | Smith | |
| 6,741,684 B2 | 5/2004 | Kaars | |
| 2002/0174425 A1 | 11/2002 | Markel et al. | |
| 2002/0198762 A1 | 12/2002 | Donato | |
| 2003/0005430 A1 * | 1/2003 | Kolessar | 725/9 |
| 2003/0163831 A1 * | 8/2003 | Gall et al. | 725/127 |

(Continued)

FOREIGN PATENT DOCUMENTS

EP 1133090 9/2001

(Continued)

OTHER PUBLICATIONS

*Written Opinion*, Dec. 9, 2004, 5 sheets.

(Continued)

*Primary Examiner* — Joseph P Hirl
*Assistant Examiner* — Jivka Rabovianski
(74) *Attorney, Agent, or Firm* — Hanley, Flight & Zimmerman, LLC.

(57) ABSTRACT

Methods and apparatus to collect audience information associated with a media presentation are described herein. In an example method, a first media metering device associated with a media presentation device monitors for a presence of one or more other media metering devices and a monitoring operation of the first media metering device is halted based on the presence of the one or more other media metering devices.

15 Claims, 9 Drawing Sheets

U.S. PATENT DOCUMENTS

| | | | |
|---|---|---|---|
| 2003/0170001 A1* | 9/2003 | Breen | 386/46 |
| 2003/0171833 A1 | 9/2003 | Crystal et al. | |
| 2003/0177488 A1 | 9/2003 | Smith et al. | |
| 2005/0216509 A1 | 9/2005 | Kolessar et al. | |
| 2006/0242325 A1* | 10/2006 | Ramaswamy et al. | 709/246 |
| 2008/0140479 A1 | 6/2008 | Mello et al. | |

FOREIGN PATENT DOCUMENTS

| | | |
|---|---|---|
| EP | 1213860 | 6/2002 |
| WO | 9504430 | 2/1995 |
| WO | 9933206 | 7/1999 |

OTHER PUBLICATIONS

*International Search Report*, Feb. 19, 2004, 5 sheets.

Roy Want, Kenneth P. Fishkin, Anuj Gujar, Beverly L. Harrison, "Bridging Physical and Virtual Worlds with Electronic Tags," ACM CHI '99, Pittsburgh, PA, May 15-20, 1999. ACM Press. Retrieved from http://citeseer.ist.psu.edu/352441.html.

International Preliminary Examination Report corresponding to International Patent Application No. PCT/US2003/012371, Mar. 30, 2005, 6 sheets.

Substantive Examination Adverse Report, issued in Application No. PI 20031501, mailed Aug. 14, 2009, 3 pages.

Mexican Patent Office, "Office Action", in connection with Mexican Patent Application Serial No. MX/a/2007/012204, including English discussion of the same, dated Jun. 8, 2010 (4 pages).

Canadian Intellectual Property Office, "Office Action" in connection with Canadian Application Serial No. 2,483,042, dated Jun. 15, 2010 (8 pages).

European Patent Office, Supplementary European Search Report issued in connection with EP Application No. EP03750041, mailed on Oct. 11, 2010, 3 pages.

\* cited by examiner

METHODS AND APPARATUS TO COLLECT AUDIENCE INFORMATION ASSOCIATED WITH A MEDIA PRESENTATION

RELATED APPLICATIONS

This application is a continuation of PCT Application No. PCT/US03/12371, filed Apr. 21, 2003, which claims the benefit of the filing date of U.S. Provisional Application No. 60/374,130, filed Apr. 22, 2002.

TECHNICAL FIELD

The present disclosure relates generally to audience measurement, and more particularly, to methods and apparatus to collect viewing information associated with the audience of a media presentation.

BACKGROUND

Determining the size and demographics of a television viewing audience helps television program producers improve their television programming and determine a price for advertising during such programming. In addition, accurate television viewing demographics allows advertisers to target certain types and sizes of audiences.

In order to collect these demographics, an audience measurement company may enlist a plurality of television viewers to cooperate in an audience measurement study for a predefined length of time. The viewing habits of these enlisted viewers as well as demographic data about these enlisted viewers is collected and used to statistically determine the size and demographics of a television viewing audience. In some cases, automatic measurement systems may be supplemented with survey information recorded manually by the viewing audience members.

The process of enlisting and retaining participants for purposes of audience measurement can be a difficult and costly aspect of the audience measurement process. For example, participants must be carefully selected and screened for particular characteristics so that the population of participants is representative of the overall viewing population. In addition, the participants must be willing to perform specific tasks that enable the collection of the data and, ideally, the participants selected must be diligent about performing these specific tasks so that the audience measurement data accurately reflects their viewing habits.

For example, audience measurement systems typically require some amount of on-going input from the participating audience member. One method of collecting viewer input involves the use of a people meter. A people meter is an electronic device that is typically disposed in the viewing area and that is proximate to one or more of the viewers. The people meter is adapted to communicate with a television meter disposed in, for example, a set top box, that measures various signals associated with the television for a variety of purposes including, but not limited to, determining the operational status of the television, i.e., whether the television is off or on, and identifying the programming being displayed by the television. Based on any number of triggers, including, for example a channel change or an elapsed period of time, the people meter prompts the household viewers to input information by depressing one of a set of buttons each of which is assigned to represent a different household member. For example, the people meter may prompt the viewers to register, i.e., log in, or may prompt the viewers to indicate that they are still present in the viewing audience. Although periodically inputting information in response to a prompt may not be burdensome when required for an hour, a day or even a week or two, some participants find the prompting and data input tasks to be intrusive and annoying over longer periods of time.

In addition to performing tasks associated with viewing, participants must also be willing to have their media systems modified to enable measurement of their viewing habits, a requirement that typically involves allowing field personnel to gain access to their homes. Allowing access to the home is often viewed as intrusive by would-be participants and requires the would-be participant to schedule a time to allow such access. The would-be participant may also be unwilling to risk the damage that may occur as a result of allowing field personnel to modify an expensive home media system.

Moreover, there are costs associated with engaging and training field personnel who not only install such audience measurement systems in the homes of participants but who also return to the homes on an as-needed basis to repair the equipment and to remove the equipment when the participants are either no longer willing to participate, have moved from their homes, or have reached the end of the term for which they originally agreed to participate.

To reduce the costs and resources required to enlist and retain participants and to engage and train field support, audience measurement companies are researching ways to make participation as convenient as possible for the participants and to minimize the amount of in-home installation/repair required to support in-home audience measurement.

Another aspect of audience measurement involves attempting to measure not only viewing that occurs within the home, referred to as in-home viewing, but also viewing that occurs outside of the home, referred to as out-of-home viewing. In today's world, the average viewer is frequently exposed to media sources outside the home. Specifically, televisions and display monitors are encountered in places such as airports, shopping centers, retail establishments, restaurants and bars, to name only a few locations. To measure out-of-home television viewing, portable devices have been developed to capture audio codes from the audio signals emanating from a television set. These codes are later transmitted to a central data processing facility which uses the codes to identify the programming that was viewed and to properly credit that viewing to the appropriate program. Because such devices are portable, they may be used to measure viewing that occurs both inside the home and outside the home. Unfortunately, these portable audio code detection devices have inherent limitations.

Specifically, these portable devices are unable to distinguish between codes captured as a result of in-home viewing and codes captured as a result of out-of-home viewing. Yet there are characteristic differences between in-home television viewing and out-of-home television viewing that may be of interest to consumers of audience measurement data. Specifically, an in-home viewer often focuses much or all of his attention on the television program being viewed. In contrast, out-of-home television viewing may involve the focused attention of the viewer or may instead involve a brief glance at a television screen as the viewer walks past a television located, for example, in an airport. In addition, in-home television viewing is typically performed on a selective basis, i.e., the viewer likely has control over the selection of programming displayed on the in-home television, whereas out-of-home viewing is less likely to be performed on a selective basis, i.e., the out-of-home viewer is less likely to have individual control over the selection of the programming being displayed on the out-of-home television.

Thus, audience measurement companies are researching ways to distinguish between data associated with in-home television viewing and data associated with out-of-home television viewing.

DETAILED DESCRIPTION

Although the following discloses example systems including, among other components, software executed on hardware, it should be noted that such systems are merely illustrative and should not be considered as limiting. For example, it is contemplated that any or all of the disclosed hardware and software components could be embodied exclusively in dedicated hardware, exclusively in software, exclusively in firmware or in some combination of hardware, firmware, and/or software.

In addition, while the following disclosure is made with respect to example television systems, it should be understood that the disclosed system is readily applicable to many other media systems. Accordingly, while the following describes example systems and processes, persons of ordinary skill in the art will readily appreciate that the disclosed examples are not the only way to implement such systems.

Figure 1:
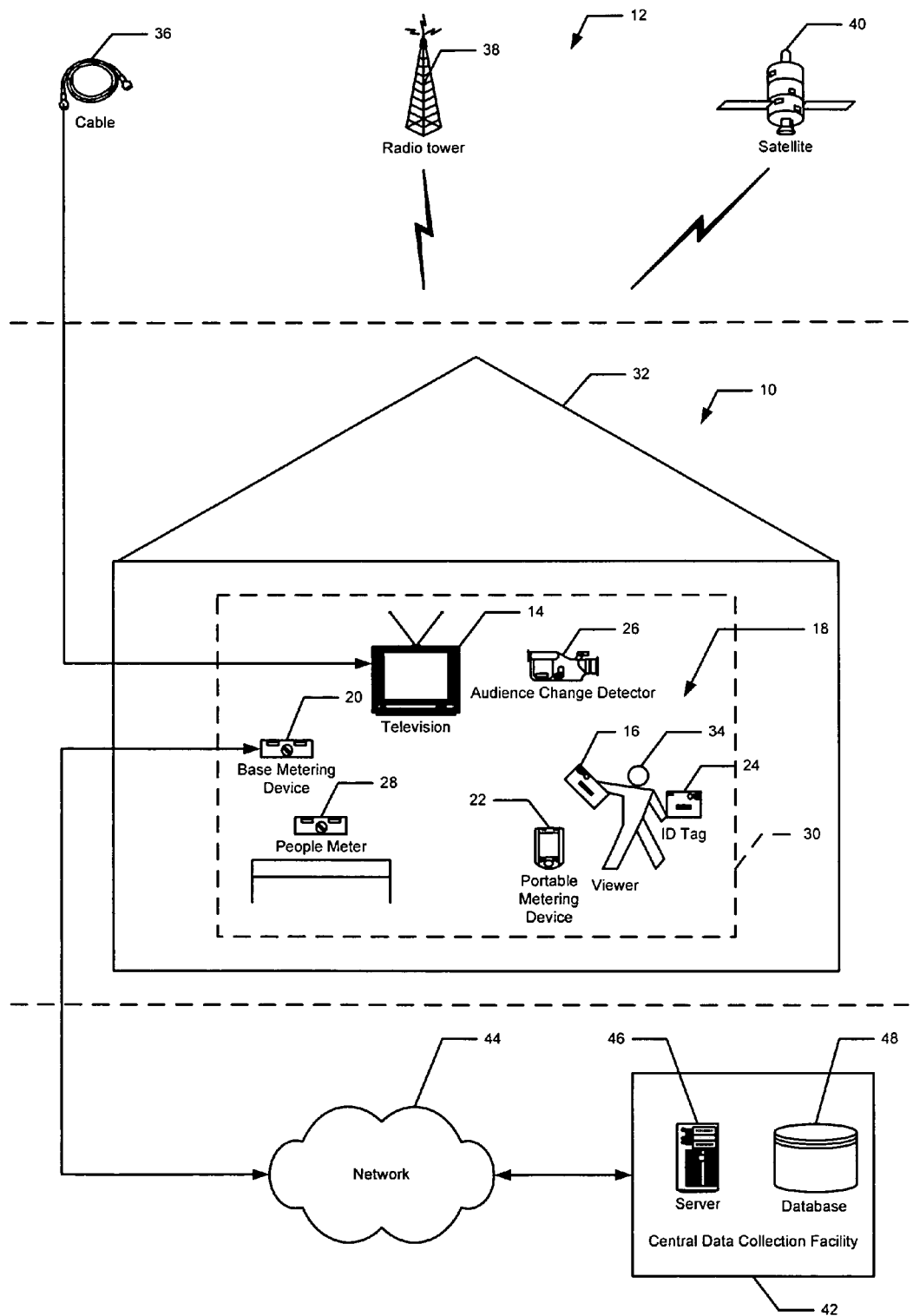
FIG. 1 is a block diagram representation of an example television system.

In the example of FIG. 1, an example television system 10 including a television service provider 12, a television 14, and a remote control device 16 is metered using an audience measurement system 18 having a base metering device 20, a portable metering device 22, an identification tag 24, an audience change detector 26, and a people meter 28. The components of the television system 10 may be coupled in any well known manner, such as that shown in FIG. 1. The television 14 is positioned in a viewing area 30 located within a house 32 occupied by one or more people, referred to as household members 34, all of whom have agreed to participate in an audience measurement research study. The viewing area 30 includes the area in which the television 14 is located and from which the television 14 may be viewed by one or more household members 34 located in the viewing area 30.

The television service provider 12 may be implemented using any television service provider 12 such as, but not limited to, a cable television service provider 36, a radio frequency (RF) television provider 38, and/or a satellite television service provider 40. The television 14 receives a plurality of television signals transmitted via a plurality of channels by the television service provider 12 and may be adapted to process and display television signals provided in any format such as an National Television Standards Committee (NTSC) television signal format, a high definition television (HDTV) signal format, an Advanced Television Systems Committee (ATSC) television signal format, a phase alternation line (PAL) television signal format, a digital video broadcasting (DVB) television signal format, an Association of Radio Industries and Businesses (ARIB) television signal format, etc. The user-operated remote control device 16 allows a user to cause the television 14 to tune to and receive signals transmitted on a desired channel, and to cause the television 14 to process and present the programming content contained in the signals transmitted on the desired channel. The processing performed by the television 14 may include, for example, extracting a video component delivered via the received signal and an audio component delivered via the received signal, causing the video component to be displayed on a screen/display associated with the television 14, and causing the audio component to be emitted by speakers associated with the television. The programming content contained in the television signal may include, for example, a television program, a movie, an advertisement, a video game, and/or a preview of other programming that is or will be offered by the television service provider 12 now or in the future.

The base metering device 20 is configured as a primarily stationary device disposed on or near the television 14 and may be adapted to perform one or more of a variety of well known television metering methods. Depending on the types of metering that the base metering device 20 is adapted to perform, the base metering device 20 may be physically coupled to the television 14 or may instead be configured to capture signals emitted externally by the television 14 such that direct physical coupling to the television 14 is not required. Preferably, a base metering device 20 is provided for each television 14 disposed in the household 32, such that the base metering devices 20 may be adapted to capture data regarding all in-home viewing by the household members. In one embodiment, the base metering device 20 may be implemented as a low-cost electronic device that may be shipped to the viewer's home 32 (e.g., via regular mail) and easily installed by the viewer by, for example, plugging the base metering device 20 into a commercial power supply, i.e., an electrical outlet.

The portable metering device 22 is adapted to perform television metering using well known audio code capture techniques and/or audio signature capture techniques. The portable metering device 22 may be adapted to capture code information and signature information simultaneously. Alternatively, the portable metering device 22 may be adapted to use the code techniques as a primary metering method and to use the signature metering method as a secondary method, i.e., to supplement the metering performed using the code technique. Specifically, if one or more audio codes are detected by the portable metering device 22, then the signature method need not be performed. Conversely, if audio codes are not detected, then the portable metering device 22 may execute one or more well known methods used to capture signature information of the programming content displayed on the television 14 for purposes of metering viewing. The portable metering device 22 may be adapted to capture and process codes that are embedded in the programming content using an encoding technique such as that disclosed in pending U.S. patent application Ser. No. 09/543,480. Preferably, a different portable metering device 22 is assigned to each household member 34 residing in the home 32 and each household member 34 carries the appropriate portable metering device 22 at all times.

Referring still to FIG. 1, the base metering device 20 and the portable metering device 22 may be adapted to communicate with a remotely located central data collection facility 42 via a network 44. The network 44 may be implemented using any type of public or private network such as, but not limited to, the Internet, a telephone network, a local area network (LAN), a cable network, and/or a wireless network. To enable communication via the network 44, the base metering device 20 may include a communication interface that enables connection to an Ethernet, a digital subscriber line (DSL), a telephone line, a coaxial cable, or any wireless connection, etc. Likewise, the portable metering device 22 may include such an interface to enable communication by the portable metering device 22 via the network 44. As will be appreciated by persons of ordinary skill in the art, either or both of the base metering device 20 and the portable metering device 22 may be adapted to send viewing data to the central data collection facility 42. In the event that only one of the base metering device 20 and the portable metering device 22 is capable of transmitting data to the central data collection facility 42, the base and portable metering devices 20, 22 may be adapted to communicate data to each other so that there is a means by which data collected from all metering devices (i.e., the base metering device 20 and/or the portable metering device 22) can be transmitted to the central data collection facility 42. The central data collection facility 42 may include a server 46 and a database 48. Further, the central data collection facility 42 may be adapted to process and store data received from the base metering device 20 and/or the portable metering device 22.

The portable metering device 22 may also communicate via the network 44 using a docking station (not shown) having a cradle in which the portable metering device 22 may be deposited in order to enable transfer of data via the network 44 and to enable a battery (not shown) disposed in the portable metering device 22 to be recharged. The docking station may be operatively coupled to the network 44 via, for example, an Ethernet connection, a digital subscriber line (DSL), a telephone line, a coaxial cable, etc.

In the illustrated example, the portable metering device 22 is a portable electronic device such as, but not limited to, a portable telephone, a personal digital assistant (PDA), and/or a handheld computer. Because of its portability, the portable metering device 22 may be used to meter viewing that occurs at home, at the office, and/or any other location. For example, the portable metering device 22 may be configured to detect a movie and/or a movie preview at a movie theater. Of course, the portable metering device 22 also includes a battery (not shown) for powering the electronic circuitry disposed therein.

A portable telephone 22 used to implement the portable metering device 22 may be configured to operate in accordance with any wireless communication protocol such as, but not limited to, a code division multiple access (CDMA) based communication protocol, a time division multiple access (TDMA) based communication protocol, a global system for mobile communication (GSM) based communication protocol, a general packet radio services (GPRS) based communication protocol, an enhanced data GSM environment (EDGE) based communication protocol, a universal mobile telephone service (UMTS) based communication protocol or any other suitable wireless communication protocol. As will be appreciated by persons of ordinary skill in the art, the communication capabilities of the portable telephone may be used to enable communication of data from the portable metering device 22 to the central data collection facility 42 via the network 44. Using a portable telephone to implement the portable metering device 22 may allow the household member 34 to meet the research compliance requirements more easily and more conveniently. Specifically, the household member 34 may already carry a portable telephone on a regular basis such that carrying a portable metering device 22 implemented using a cellular telephone does not place any additional duties upon the household member 34 that the household member 34 does not already perform.

A PDA or a handheld computer used to implement the portable metering device 22 may be configured to communicate with an access point (not shown) in accordance with a short-range wireless communication protocol such as, but not limited to, a Bluetooth based communication protocol, a communication protocol that conforms to any of the Institute of Electrical and Electronics Engineers (IEEE) standards 802.11a, 802.11b, or 802.11g, or any other suitable short-range wireless communication protocol. In turn, the access point may be operatively coupled to the network 44 via, for example, an Ethernet connection, a digital subscriber line (DSL), a telephone line, a coaxial cable, a wireless telephone connection, etc. To ensure that the PDA can detect audio codes, the PDA preferably includes a microphone having automatic gain control as do a number of PDAs currently available on the market.

The audience measurement system 18 may be configured so that the base metering device 20 is adapted to be the primary source to collect all in-home viewing data and the portable metering device 22 is used as the primary source to collect all out-of-home viewing data. In yet another embodiment, the base metering device 20 may meter all in-home viewing, and the portable metering device 22 may meter all in-home and out-of-home viewing and duplicate viewing data sets collected for in-home viewing may be compared and processed to ensure that such data is credited to reflect only a single viewing. The redundant sets of data may also be used to identify discrepancies between the data and to eliminate data believed to be erroneous. In a still further embodiment, the audience measurement system 18 may be configured such that the base metering device 20 is able to detect the presence and absence of the portable metering device 22 and to use such information to determine whether metering is necessary. For example, if the base metering device 20 determines that the television 14 is turned on but there is no portable metering device 22 located in the viewing area then the base metering device 20 may begin metering the programming being displayed on the television 14. Conversely, if the base metering device 20 detects a portable metering device 22 in the viewing area 30, then the base metering device 20 may halt monitoring.

In another embodiment, if the base metering device 20 detects a portable metering device 22 in the viewing area 30, then the base metering device 20 may halt monitoring and begin emitting a signal detectable by any portable metering devices 22 located in the viewing area 30. The portable metering devices 22 may respond to the signal emitted by the base metering device 20 by causing the subsequently collected data to be identified as in-home viewing data thus allowing data collected via the portable metering devices 22 in connection with in-home viewing to be distinguishable from data collected by the portable metering devices 22 in connection with out-of-home viewing. The portable metering devices 22 may continue to identify data collected as being in-home viewing data until the signal is no longer detected by the portable metering devices 22, i.e., one of the portable metering devices 22 has been removed from the viewing area 30. Or, the base metering device 20 may emit the signal only periodically and the portable metering devices 22 may be adapted to identify data that is subsequently collected over a predefined time period as being associated with in-home viewing, wherein the predefined time period is related to the periodicity at which the base metering device 20 emits the signal.

In another embodiment, the base metering device 20 may be replaced with a device that does not perform any metering functions but is only capable of generating a signal to be received by portable metering devices 22 located in the viewing area 30. These signal generating devices may be adapted to generate signals for capture by portable metering devices 22 located in the viewing area 30, and the portable metering devices 22 may be adapted to use the signals to identify data that is collected in connection with in-home viewing. Of course, in such an embodiment, the portable metering devices 22 are the sole metering devices and, therefore, the household members' willingness to carry the portable devices assigned to them is critical to the accuracy and completeness of the data collected thereby.

In a yet further embodiment, the audience measurement system 18 may be adapted to include an audience change detector 26, such as that disclosed in PCT Patent Application Serial No. PCT/US02/39619 which is incorporated by reference herein, for identifying the number of household members 34 located in the viewing area 30. The audience change detector 26 may communicate this number to the base metering device 20 which may then compare that number to the number of portable metering devices 22 detected by the base metering device 20. If the number of detected portable metering devices 22 matches the number of household members 34 located in the viewing area 30, then the base metering device 20 need not meter the viewing because the viewing will be captured by the portable metering devices 22. If, instead, the numbers do not agree, then one or more household members 34 may not be carrying their assigned portable metering device 22, and the base metering device 20 may be adapted to meter the viewing to ensure capture of the viewing data.

The base metering device 20 may be adapted to detect the presence of one or more of the portable metering devices 22 in the viewing area 30 through the use of a short range signal transmitter/receiver disposed in the base metering device 20 and a short range signal transmitter/receiver disposed in the portable metering device 22. The short range signals transmitted between the base metering device 20 and the portable metering device 22 may be, for example, infrared signals, and may be adapted to provide information that identifies the household member 34 assigned to carry the portable metering device 22 and the short range signals may further be adapted to provide information about whether the short range signal originated from a portable metering device 22 or originated from a short range signal transmitter associated with, for example, one of the identification tags 24 to be worn by one or more of the household members 34. Such identification tags 24 may be adapted to be embedded in jewelry, watches, clothing, etc. to decrease the likelihood that the household member 34 assigned to the identification tag 24 is opposed to wearing the identification tag 24 and may be especially useful for viewers who do not wish to carry the portable metering device 22 while in the home 32 or for household members 34, such as small children, who are not well suited for reliably carrying a portable metering device 22. The identification tags 24 may also be adapted to generate signals that provide the identity of the household member 34 assigned to wear the identification tag 24 as well as the type of device, i.e., a portable metering device 22 or an identification tag 24, from which the signals originated. The base metering device 20 may be adapted to respond to a short range signal emitted by a portable metering device 22 differently from a short range signal emitted by an identification tag 24. Further, the identification tag 24 does not have metering capabilities. Therefore, the detection of a signal emitted by the identification tag 24 will not eliminate the need for the base metering device 20 to meter viewing. In contrast, the portable metering device 22 does have metering capabilities such that the base metering device 20 may be configured to respond to a signal transmitted by a portable metering device 22 by altering its metering procedure, i.e., the base metering device 20 may stop metering and/or may emit a signal for capture by the portable metering device 22 as described above.

The use of both identification tags 24 and portable metering devices 22 that are detectable by the base metering device 20 allows the household members 34 a greater range of flexibility in terms of complying with the requirements of the audience measurement research company. In addition, the use of detectable identification tags 24 and portable metering devices 22 enables the audience measurement system 18 to more accurately identify the members of the viewing audience even when such members are not complying with the research requirements. For example, in a further embodiment, the audience measurement system 18 may be configured such that the base metering device 20 is adapted to use information collected from the identification tags 24 located in the viewing area 30, from the portable metering devices 22 located in the viewing area 30, and from the audience change detector 26 to deduce the identities of household members 34 located in the viewing area 30 who are not carrying a portable metering device 22 and who are not wearing an identification tag 24. In such an embodiment, the base metering device 20 may compare the number of household members 34 detected in the viewing area 30 using the audience change detector 26 and may compare this number to the number of people identified via signals received from identification tags 24 and from portable metering devices 22. If these numbers are the same, then no deduction is necessary as the base metering device 20 can identify each household member 34 using the signals generated by the identification tags 24 and the portable metering devices 22.

If, instead, the number of household members 34 identified in the viewing area 30 by the audience change detector 26 is greater than the number of household members 34 identified in the viewing area 30 using the signals generated by identification tags 24 and the portable metering devices 22, then the base metering device 20 may determine the number of household members 34 present in the viewing area 30 who are not associated with an identification tag 24 or a portable metering device 22 and may use a master list of household members 34 to identify household members 34 for whom an identification tag 24 signal or a portable metering device 22 signal has not been received. For example, if the household 32 has two adults and a single child, the audience change detector 26 identifies three people in the viewing area 30, and the signals originating from the identification tags 24 indicate that two of the viewers located in the viewing area 30 are the adults, then the base metering device 20 identifies the unidentified household member 34 as the child who lives in the household 32. If, instead, two adults and two children live in the metered household 32, and if the signals originating from the identification tags 24 indicate that two of the household members 34 located in the viewing area 30 are the adults, then the base metering device 20 identifies the unidentified household member 34 as one of the two children living in the household 32. If the audience change detector 26 detects four people in the viewing area 30 of a household 32 only having three members 34, then the base metering device 20 may assume that a visitor is present in the viewing area 30.

In yet another embodiment, the audience measurement system 18 may include a people meter 28 disposed in the viewing area 30, preferably within comfortable reach of the household members 34, and having a set of buttons (not shown) disposed thereon. Each button may be assigned to represent a single, different one of the household members 34 residing within the household 32. The people meter 28 may be adapted to periodically prompt the household members 34, via a set of LEDs, a display screen, and/or an audible tone, to indicate that they are present in the viewing area 30 by pressing their assigned button. To decrease the number of prompts, and thus the number of intrusions imposed upon the household members' 34 television watching experience, the base metering device 20 may be adapted to cause the people meter 28 to prompt only when unidentified household members 34 are located in the viewing area 30 and/or to prompt only the unidentified viewers 34 as determined by a process of elimination performed by the base metering device 20 using information received from identification tags 24 and/or portable metering devices 22 located in the viewing area 30. For example, if the base metering device 20 uses the audience change detector 26 to detect that two household members 34 are located in the viewing area 30, but an identification signal has only been received from the identification tag 24 assigned to the male, adult household member 34, then the base metering device 20 may cause the people meter 28 to prompt only the female, adult household member 34 and the child household member 34 in an attempt to identify the unidentified household member 34. If a response to the prompt is received, then the base metering device 20 may use the response to identify the additional viewer and to associate this identity with collected viewing data. If no response is received, then the base metering device 20 may assume that a visitor is present in the viewing area 30 and may credit the viewing accordingly.

The people meter 28 may be implemented as a stand alone device that is communicatively coupled to the base metering device 20 or as an integral part of the base metering device 20. In one embodiment, the people meter 28 may be implemented as an integral part of the remote control device 16. In another embodiment, the people meter 28 may be implemented using a PDA or a cellular telephone that is kept within comfortable arms reach of the viewers located in the viewing area 30. In such an embodiment, the PDA or portable telephone may be adapted to include all of the components disposed, in or associated with, the portable metering device 22 except for the television audience measurement circuitry. Further the PDA-based or portable phone-based people meter 28 may be programmed to perform any of a variety of well known people prompting routines. Because people meters are well known in the art and may be implemented using any of a variety of well known configurations further detail regarding an implementation of the people meter 28 is not provided herein.

Figure 2:
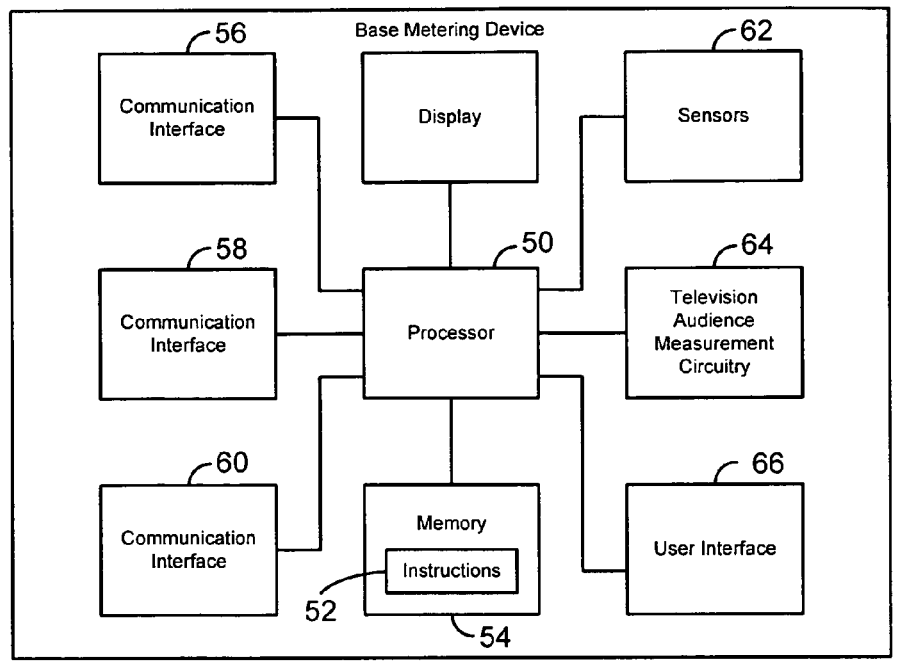
FIG. 2 is a block diagram representation of an example base metering device.

Referring now to FIG. 2, in one embodiment, the base metering device 20 may be equipped with a processor 50 which executes a set of instructions 52 stored in a memory 54 to control the operation of the base metering device 20 in a manner that enables the functionality described herein. The program or the set of operating instructions 52 may be embodied in a computer-readable medium such as a programmable gate array, an application specific integrated circuit (ASIC), an erasable programmable read only memory (EPROM), a read only memory (ROM), a random access memory (RAM), a magnetic media, an optical media and/or any other suitable type of medium. The base metering device 20 may also be equipped with a first communication interface 56 that allows communication between the base metering device 20 and the remotely located central data collection facility 42 via the network 44, a second communication interface 58 that enables the transfer of viewing data between the base metering device 20 and the portable metering device 22, a third communication interface 60 that enables the communication of identification information between the base metering device 20 and the portable metering device 22, one or more sensors 62 for detecting signals being emitted by the television 14 and any circuitry 64 necessary to perform one or more methods of television audience measurement. As will be appreciated by persons of ordinary skill in the art, there are a variety of well known ways to configure the sensors 62 and circuitry 64 to enable television audience measurement and any given configuration will depend on the method of television audience measurement being employed. As a result, further detail regarding this circuitry is not provided herein. Moreover, although the television audience measurement circuitry 64 is shown in FIG. 2 as a separate component for the base metering device 20, the circuitry 64 may be integral with any of the other base metering device 20 components such as the processor 50 and memory 54. The first communication interface 56 may be implemented using any, conventional communication interface capable of enabling communication with the central data collection facility 42 via the network 44 including for example, an Ethernet card, a digital subscriber line, a coaxial cable, or any wireless connection. The second and third communication interfaces 58, 60 enable communication between the base metering device 20 and the portable metering device 22, and in one embodiment, may be implemented in a single communication interface. The second communication interface 58 enables transfer of viewing data between the base metering device 20 and the portable metering device 22. In most cases, the data transfer may occur regardless of proximity between the base metering device 20 and the portable metering device 22 such that the second communication interface 58 may allow wireless communication between the devices 20, 22 where remotely situated relative to each other. The primary reason for viewing data transfer between the devices 20, 22 will be for the purpose of consolidating household viewing data before the data is transmitted to the central data collection facility 42. If desired, each base metering device 20 and portable metering device 22 may be adapted to separately communicate viewing data to the central data collection facility 42 such that viewing data transfer between the base metering device 20 and the portable metering device 22 need not occur, thereby eliminating the need for the second communication interface 58. The third communication interface 60 enables short range communication between the base metering device 20 and the portable metering device 22 and is configured to allow such communication only when the base metering device 20 and the portable metering device 22 are within a predefined distance of each other. By limiting communication of identification signals to a predefined distance, the third communication interface 60 to enables the detection of a portable metering device 22 by the base metering device 20, only when the portable metering device 22 is within the viewing area, provided, of course, that the predefined distance is shorter then the farthest distance a household member 34 can be located from the base metering device 20 and still be located in the viewing area 30. As a result, the base metering device 20 will not erroneously count a household member as being a viewer, i.e., located in the viewing area 30, when the household member 34 is in fact, located outside of the viewing area 30. The base metering device 20 may additionally include a user interface 66 by which the household member 34 may inform the base metering device 20 of their identities and by which the household members 34 may enter demographic information about themselves including, for example, age, race, sex, household income, etc. The processor 50 causes the identities of each household member 34 and each household member's 34 corresponding demographic information to be stored in the memory 54. This information may subsequently be transmitted by the base metering device 20 to the central data collection facility 42. Alternatively, the remote control device 16 may be adapted to accept the input of this identity and demographic information and to transmit this information to the base metering device 20 for storage therein. In yet another embodiment, the portable metering device 22 may include a user interface at which the user may enter this identity and demographic information as described in detail below. The information may subsequently be transmitted by the portable metering device 22 to the base metering device 20 or by the portable metering device 22 to the central data collection facility 42.

Figure 3:
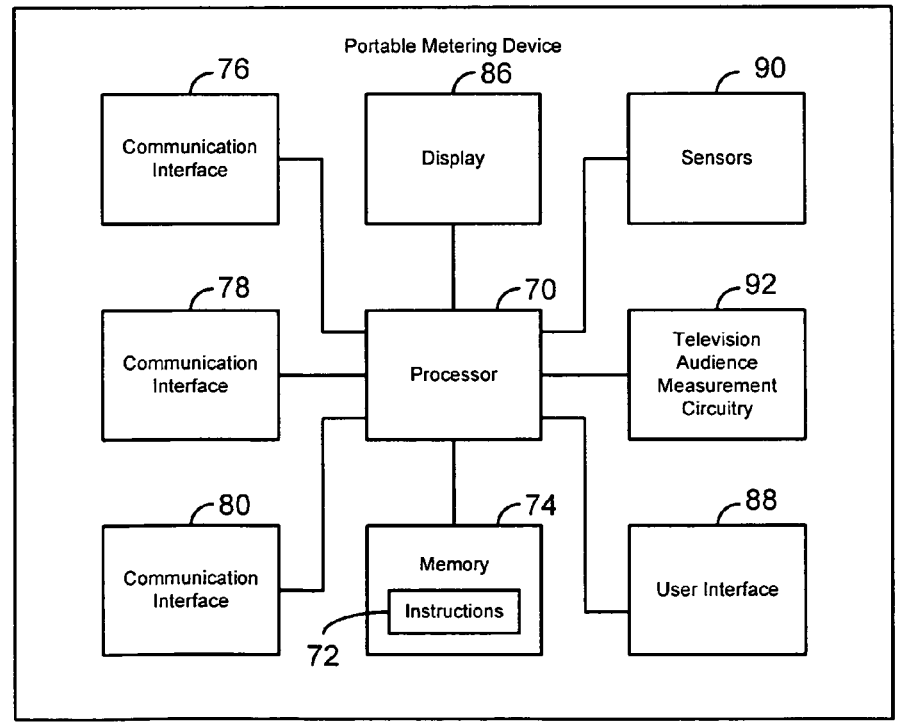
FIG. 3 is a block diagram representation of an example portable metering device.

Referring now to FIG. 3, in one embodiment, the portable metering device 22 may be equipped with a processor 70 which executes a set of instructions 72 stored in a memory 74 to control the operation of the portable metering device 22 in a manner that enables the functionality described herein. The program or the set of operating instructions 72 may be embodied in a computer-readable medium such as a programmable gate array, an application specific integrated circuit (ASIC), an erasable programmable read only memory (EPROM), a read only memory (ROM), a random access memory (RAM), a magnetic media, an optical media and/or any other suitable type of medium. Preferably, the processor 70 is capable of integer based numerical processing instead of floating point processing.

The portable metering device 22 may also include a first communication interface 76 that allows communication between the portable metering device 22 and the remotely located central data collection facility 42, a second communication interface 78 that enables the transfer of viewing data between the base metering device 20 and the portable metering device 22, a third communication interface 80 that enables the communication of identification information between the base metering device 20 and the portable metering device 22, a display 86, a user interface 88, one or more sensors 90 for detecting signals being emitted by the television 14 and any circuitry 92 necessary to perform any of the methods of television audience measurement that involve capturing and processing audio codes and/or audio signatures from an audio signal emanating from the television 14. As will be appreciated by persons of ordinary skill in the art, there a variety of well known ways to configure circuitry 92 to enable television audience measurement methods that involve capture and processing of audio codes and/or audio signatures. As a result, further detail regarding such circuitry is not provided herein. In addition, the memory 74 may be supplemented with one or more storage cards (not shown) in which data may be temporarily stored, or cached, before the data being transmitted by one or more of the communication interfaces 76, 78, 80 to thereby compensate for any bandwidth limitations associated with the communication capabilities of the portable metering device 22.

The display 86 is operatively coupled to the processor 70 and may be implemented using a light emitting diode (LED) display, a liquid crystal display (LCD), or any other suitable display configured to present visual information, such as data indicating the operation of the processor 70. For example, the display 86 may indicate that the viewer 34 logged in, and/or may identify the programming content carried by the channel selected by the viewer 34 via the remote control device 16.

The user interface 88 may be used by the household member 34 to enter data and commands into the processor 70. For example, the user interface 88 may be implemented using a keyboard, a mouse, a track pad, a track ball, and/or a voice recognition system. Although the display 86 and the user interface 88 are shown as separate components, the display 86 and the user interface 88 may instead be integrated into a single component such as, but not limited to, a touch-sensitive display configured to enable interaction between the household member 34 and the portable metering device 22.

Of course, if the portable metering device 22 is implemented using a portable cellular telephone, then the portable metering device 22 will additionally include the components associated with a conventional cellular telephone. Moreover, one or more of the conventional cellular telephone components may be adapted to perform one or more of the functions performed by the processor 70, instructions 72, memory 74, and/or the first, second or third communication interfaces 76, 78, 80, such that one or more of the foregoing components may be eliminated from the portable metering device 22. Likewise, if the portable metering device 22 is implemented using a PDA or a hand-held computer, then the portable metering device 22 will additionally include the components associated with conventional PDA or hand-held computer. Moreover, one or more of the components of a conventional PDA and/or hand-held computer may be adapted to perform one or more of the functions performed by the processor 70, instructions 72, memory 74, first, second or third communication interfaces 76, 78, 80, such that one or more of the foregoing components may be eliminated from the portable metering device 22.

The portable metering device 22 may additionally include an electronic compass (not shown) configured to indicate a change of orientation by the portable metering device 22. If the electronic compass indicates no change in orientation, then the portable metering device 22 is being carried by the household member in a manner that is preventing the portable metering device 22 from communicating with the base metering device 20. To prompt the household member 34 carrying the portable metering device 22 to change the manner or position in which the portable metering device 22 is being carried, the portable metering device 22 may emit an audio signal, display a visual signal, and/or vibrate to which the household member 34 may respond by positioning the portable metering device 22 in a manner that allows communication with the base metering device 20 so that the base metering device 20 may, for example, detect the presence of the portable metering device 22 within the viewing area 30.

Alternatively, one of the sensors 62, 90 in the base metering device 20 and/or the portable metering device 22 may be implemented using a microphone coupled to a voice recognition system (not shown), installed in the metering device, that is trained to recognize the voice of one or more of the household members 34. When the household member 34 speaks within the sensing range of the microphone, the microphone collects the voice data. The base metering device 20 may use the voice data to identify the household member 34 who spoke as being located within the viewing area 30. The portable metering device 22 may use the voice data to verify/confirm that the household member 34 assigned to carry the portable metering device 22 is at least within a distance of the portable metering device 22 equal to the pickup range of the microphone.

One of the sensors 90 disposed in the portable metering device 22 may be adapted to sense when the portable metering device 22 is in near proximity to an operating television, i.e., a television 14 that is turned on, in accordance with the system disclosed in U.S. patent application Ser. No. 10/125,577. For example, the sensor 90 may be implemented using an audio sensor such as a condenser microphone, a piezoelectric microphone or any other suitable transducer configured to convert acoustic waves into electrical signals. Further, the sensor 90 may be configured to detect a 15.75 kilo-hertz (kHz) horizontal scan fly-back transformer sweep signal to determine whether a conventional television 14 is turned on or the sensor 90 may be configured to detect a sweep signal having a frequency of 31.50 kHz to detect whether a high-definition television (or other line-doubled television) is turned on. Upon detecting such a frequency signal, the sensor 90 provides an indication to the processor 70 which may respond to the signal by causing the circuitry 92 to collect viewing data. In the absence of an indication that the portable metering device 22 is in near proximity to an operating television 14, the portable metering device 22 may cause the circuitry 92 to stop collecting viewing data. The portable metering device 22 includes such a sensor 90 because audio codes may travel through walls and be detectable by other sensors 90 associated with the audience measurement circuitry 92 even when the portable metering device 22 is not located in the viewing area 30. Thus, the indication provided by the sensor 90 prevents the portable metering device 22 from collecting audio codes that were generated by a television 14 located in a different room than the household member 34 carrying the portable metering device 22 and that, therefore, are not associated with viewing performed by the household member 34 carrying the portable metering device 22.

Figure 4:
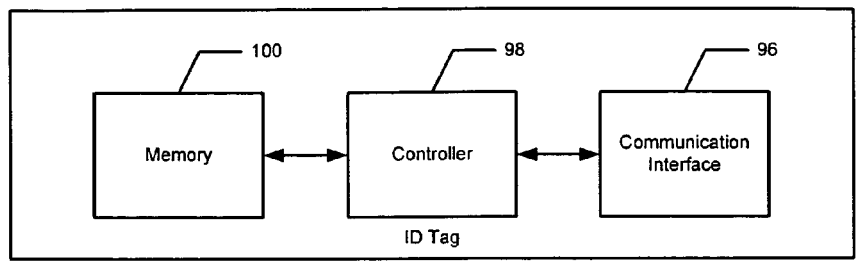
FIG. 4 is a block diagram representation of an example identification tag.

Referring now to FIG. 4, the identification tag 24 includes a communication interface 96 adapted to communicate with the third communication interface 60 disposed in the base metering device 20 and controlled by a controller 98. Further, the communication interface 96 is coupled to a storage device 100. When the identification tag 24 comes within range of the third communication interface 60 disposed in the base metering device 20, the identification tag 24 receives a signal requesting identification information from the third communication interface 60 disposed in the base metering device 20. In response to the request, the controller 98 causes an identification signal to be transmitted by the communication interface 96 to the base metering device 20. As described above, the identification signal may identify the household member 34 assigned to carry/wear the identification tag 24 and may further identify the signal as having been generated by an identification tag 24 (as opposed to a portable metering device 22). Alternatively, the identification tag 24 may be adapted to continuously or periodically generate a signal such that when the identification tag 24 comes within range of the base metering device 20, the base metering device 20 detects the signal and responds to the signal by emitting a request for identification information. Or, the signal that is continuously or periodically emitted by the identification tag 24 may include identity information such that the base metering device 20 need only receive the signal without performing a request for additional information. In one embodiment, the communication interface 96 may be adapted to transmit and receive information such that the communication interface 96 includes a receiver and a transmitter. In another embodiment, the identification tag 24 may only be adapted to transmit information and therefore the communication interface 96 may only include a transmitter. The devices used to implement the controller 98 and the storage device 100 will depend on the type of communication to be performed by the identification tag 24. Specifically, if the identification tag 24 only transmits information, the complexity of the controller 98 will be reduced. Likewise, the amount of information to be stored in the storage device 100 will affect whether a static memory or a dynamic memory is required. Regardless though, of the level of functionality embedded in the identification tag 24, any number of configurations of the controller 98 and storage device 100 may be implemented by persons of ordinary skill in the art, such that further detail regarding such configurations is not provided herein. Thus, the identification tag 24 allows the base metering device 20 to detect the presence of the household member 34 carrying/wearing the identification tag 24 when the household member 34 comes into the communication range of the base metering device 20 which preferably extends only as far as the boundary of the viewing area 30.

Figure 5:
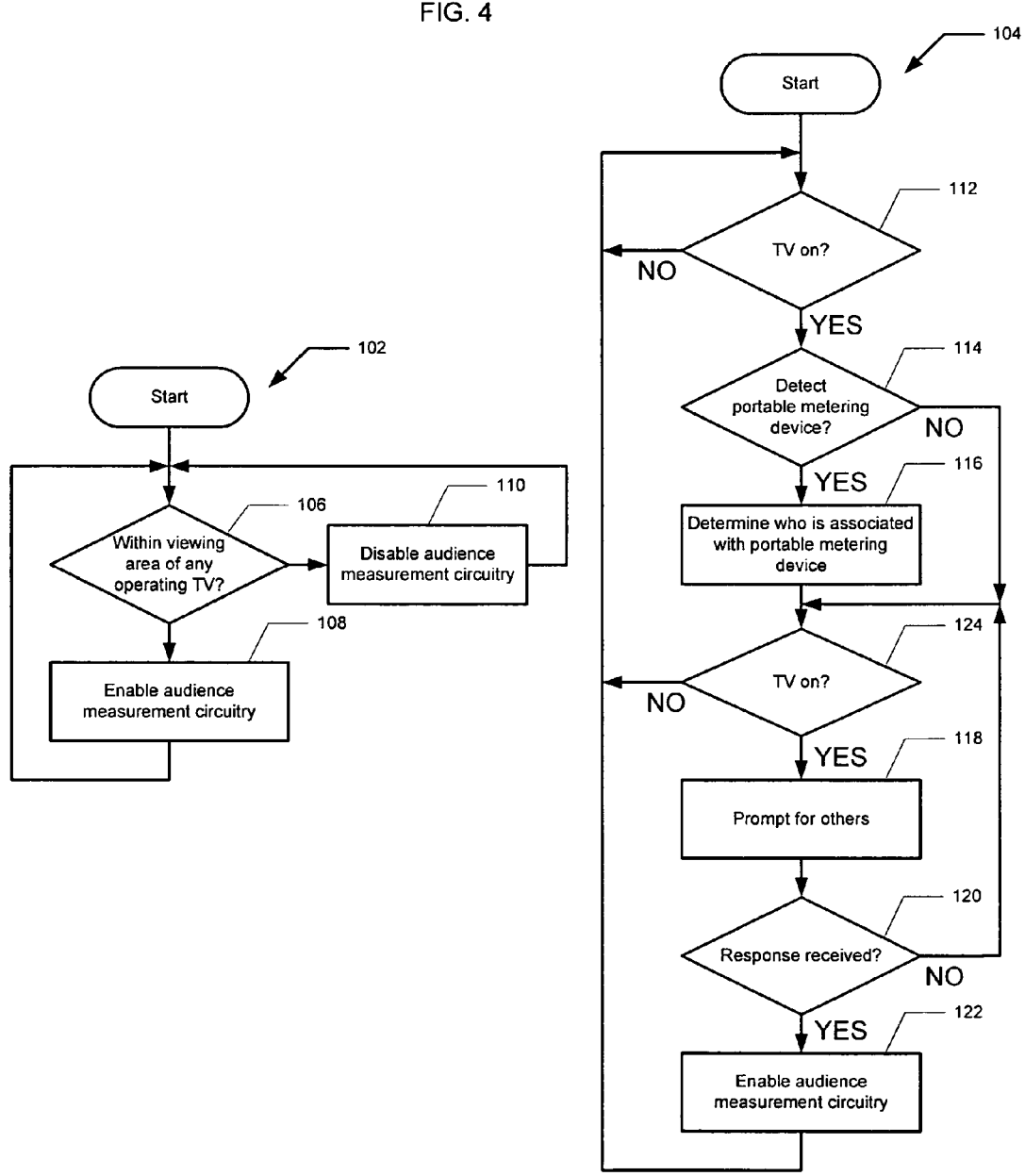
FIG. 5 is a flow diagram representation of an example method to collect audience information associated with a media presentation.

Referring now to FIGS. 1 and 5, as described above, the portable metering device 22 may be used as a primary source of viewing data and the base metering device 20 may be used as a supplemental source of viewing data. In such an embodiment, the portable metering device 22 may adapted to perform a method represented by a set of blocks 102 that may be implemented using the software instructions 72 stored in the memory 74 and executed by the processor 70. Likewise, the base metering device 20 may be adapted to perform a method represented by a set of blocks 104 that may be implemented using software instructions 52 stored in the memory 54 and executed by the processor 50. The method 102 causes the portable metering device 22 to enable the operation of the audience measurement circuitry 92 when the portable metering device 22 is within the viewing area 30 of any operating television 14 (blocks 106 and 108) regardless of whether the operating television 14 is located within the household and to disable the audience measurement circuitry 92 when the portable metering device 22 is not within the viewing area 30 of any operating television (blocks 106 and 110). When the audience measurement circuitry 92 is enabled, the portable metering device 22 collects viewing data and when the audience measurement circuitry 92 is not enabled, no viewing data is collected. Thus, according to the set of blocks 102, the portable metering device 22 collects viewing data for viewing performed via any operating television regardless of whether the viewing is associated with in-home or out-of-home viewing.

In contrast, the method 104 causes the base metering device 20 to only collect viewing data when the television 14 associated with the base metering device 20 is operating and the base metering device 20 does not detect a portable metering device 22 within the viewing area 30. The base metering device 20 detects whether the associated television 14 is operating (block 112), and if the television 14 is operating, then the base metering device 20 determines whether any signals have been detected that indicate the presence of a portable metering device 22 within the viewing area 30 (block 114). If a portable metering device 22 is detected within the viewing area 30, then the base metering device 20 determines the identity of the household member 34 associated with the detected portable metering device 22 (block 116) and then causes the people meter 28 to prompt all other household members 34 to indicate whether any of such members 34 are present in the viewing area 30 by, for example, depressing their assigned button (block 118). If one or more of the household members 34 responds to the prompt (block 120), thereby indicating that the member(s) 34 is viewing the television 14, then the base metering device 20 enables the audience measurement circuitry 64 thereby causing it to collect viewing data (block 122). The base metering device 20 may then continue to collect viewing data until there are no household members 34 located in viewing area 30 who are not carrying a portable metering device 22 or until the television is turned off. The base metering device 20 may detect the continued presence of the household members 34 in the viewing area 30 by causing the people meter 28 to continue to periodically prompt the household members 34 in accordance with any well known people meter prompting scheme, i.e., periodically, after a channel change, etc. If, instead, no household members 34 respond to the prompt, then the base metering device 20 need not collect viewing data because the only household member 34 within the viewing area 30 is carrying a portable metering device 22 that is already collecting viewing data in accordance with the method 102. Instead, the method 102 loops back to the block 118 and continues to prompt for other household members 34 who may subsequently enter the viewing area 30, provided, of course, that the television 14 is still operating (block 124). If the television stops operating, the method 102 returns to the block 112. If at the block 114, no portable metering devices 22 are detected, then the method skips the block 116 and performs block 118 to prompt all household members. Thus, the set of blocks 104 cause the base metering device 20 to collect viewing data only if one or more household members are located within the viewing area 30 but are not carrying a portable metering device 22. As will be appreciated by persons of ordinary skill in the art, the methods 102 and 104 are performed independently, yet, allow the base metering device 20 and portable metering device 22 to be used in a complementary manner so that all in-home and out-of-home viewing is collected in a manner that is convenient to the household members 34. The methods 102 and 104 are intended for use by an embodiment of the audience measurement system 18 without identification tags 24.

The method of FIG. 5 may be modified to cause the base metering device 20 to periodically or continuously emit a signal for reception by the portable metering device 22 located within the viewing area 30. Preferably, the signal uniquely identifies the base metering device 20 that transmitted the signal. For example, the block 116 of FIG. 5 may be modified such that in addition to identifying the household members 34 associated with the portable metering devices 22 located in the viewing area 30, the base metering device 20 also emits a signal that, when detected by the portable metering devices 22 located in the viewing area 30, causes the portable metering devices 22 to identify data collected while located in the viewing area 30 as being in-home viewing data, i.e., data collected in connection with viewing that occurred in-home. The block 108 of the method 102 may be modified to cause the portable metering device 22 to identify the viewing data as in-home viewing data. Thus, the methods 102 and 104 modified as described above cause viewing data collected by the portable metering device 22 in connection with in-home viewing to be identified as such. When this data is received, the central data collection facility 42 can distinguish between viewing data collected in connection with in-home viewing and viewing data collected in connection with out-of-home viewing.

Figure 6:
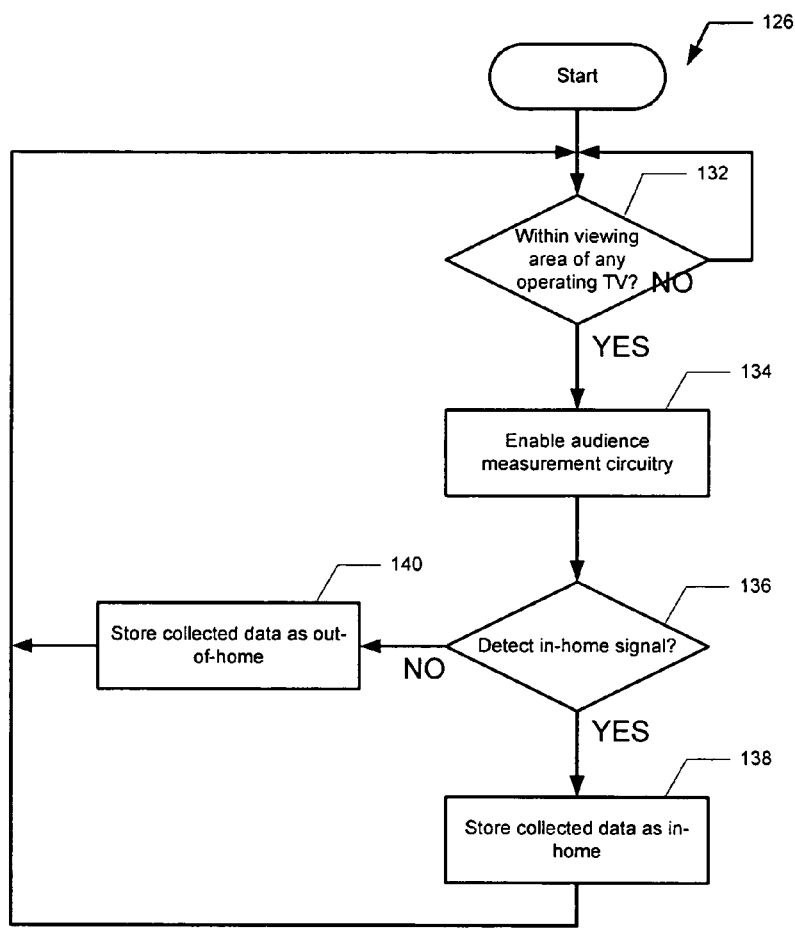
FIG. 6 is a flow diagram representation of another example method to collect audience information associated with a media presentation.
Figure 6:
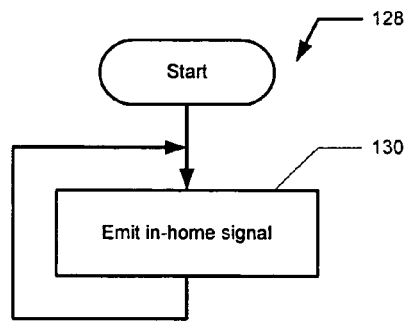

Referring now to FIG. 6, the portable metering device 22 may be used as the only source to meter viewing data and the base metering device 20 may be replaced with a signal generating device. In such an embodiment, the portable metering device 22 may adapted to perform a method represented by a set of blocks 126 that may be implemented using the software instructions 72 stored in the memory 74 and executed by the processor 70. Likewise, the modified base metering device 20 may be adapted to perform a method represented by a set of blocks 128 that may be implemented using the software instructions 52 stored in the memory 54 and executed by the processor 50. The method 128 may begin at a block 130 at which the modified base metering device 20 continuously or periodically emits a signal for reception by any portable metering devices 22 located within the viewing area 30 of the television 14. In another embodiment, the modified base metering device 20 may be adapted to only emit the in-home viewing signal in response to sensing one or more portable metering devices 22 within the viewing area 30. Of course, in this embodiment, the modified base metering device 20 will include signal sensing capabilities as well as signal generating capabilities. As will be appreciated by persons of ordinary skill in the art, either of these embodiments of the modified base metering device 20 need not include a processor and instructions but may instead be implemented using, for example, a signal transmitter and receiver and a data register for holding data that uniquely identifies the modified base metering device 20 and simple logic circuitry that causes the device to operate according to the method 128.

The method 126 may begin at a block 132 at which the portable metering device 22 determines whether it is located within the viewing area 30 of an operating television. This may be performed using, for example, information supplied by one of the sensors 90 adapted to sense a frequency signal produced by a flyback transformer associated with the television as described above. If the portable metering device 22 is located within the viewing area of an operating television, then the audience measurement circuitry 92 is enabled and begins collecting viewing data (block 134). In addition to enabling the audience measurement circuitry 92, the portable metering device 22 determines whether a signal generated by the modified base metering device 20 has been detected, thereby indicating that the portable metering device 22 is located within a viewing area 30 located in the home 32. If the signal is detected, the viewing data collected by the portable metering device 22 is identified as in-home viewing data (block 138). If no such signal is detected, then the viewing data collected by the portable metering device 22 is identified as out-of-home viewing data (block 140).

Figure 7:
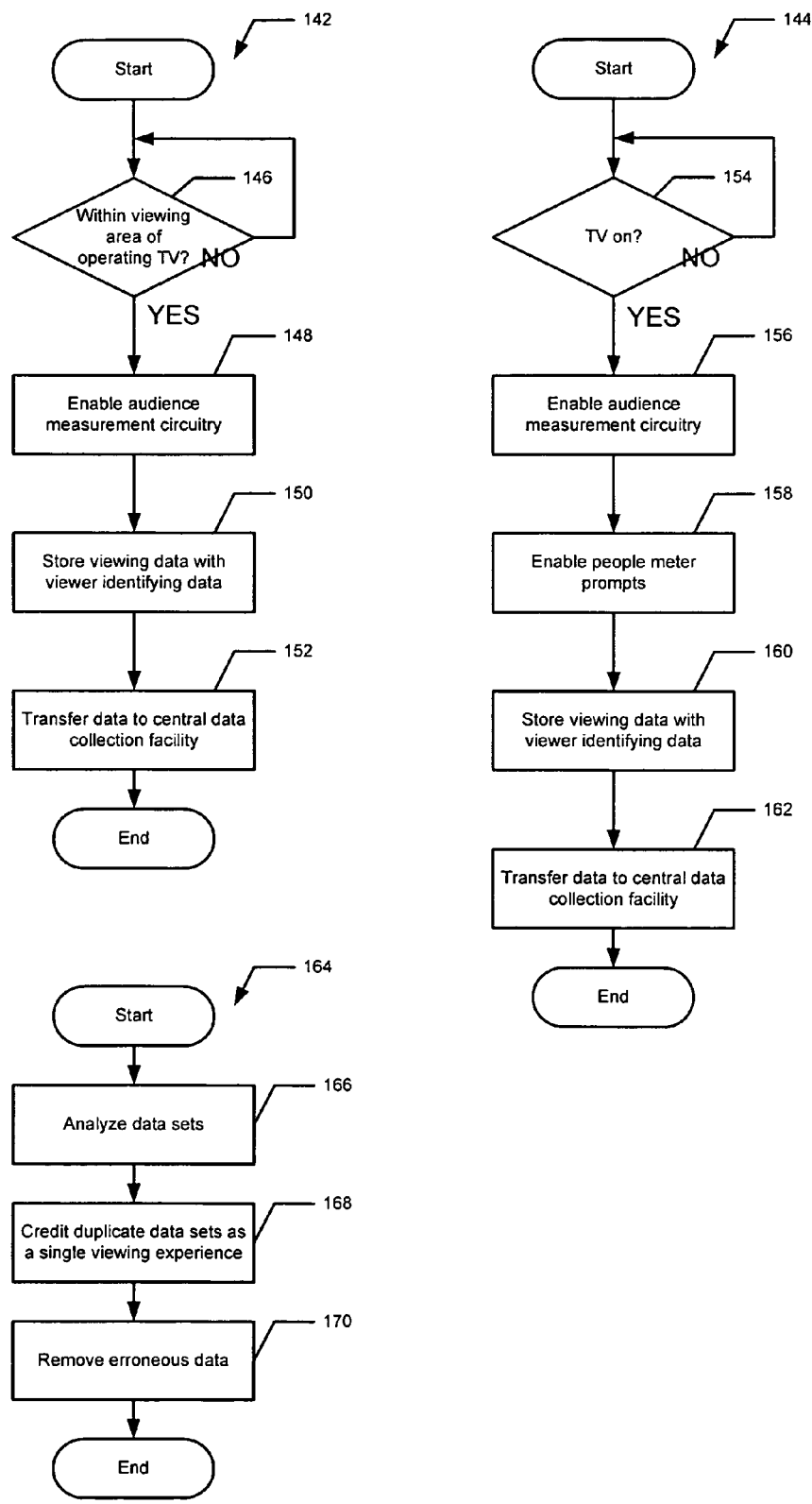
FIG. 7 is a flow diagram representation of another example method to collect audience information associated with a media presentation.

In another embodiment, the audience measurement system 18 may include a base metering device 20 adapted to collect viewing data for all in-home viewing and a portable metering device 22 adapted to collect viewing data for all in-home viewing and all out-of-home viewing. In such an embodiment, the portable metering device 22 may be adapted to perform a method represented by a set of blocks 142 that may be implemented using software instructions 72 stored in the memory 74 and executed by the processor 70. Likewise, the base metering device 20 may be adapted to perform a method represented by a set of blocks 144 that may be implemented using software instructions 52 stored in the memory 54 and executed by the processor 50. According to the method 142 shown in FIG. 7, the portable metering device 22 collects viewing data whenever the portable metering device 22 is within the viewing area 30 of an operating television 14 (blocks 146, 148). Using the method 144, the base metering device 20 collects viewing data whenever the television 14 associated with the base metering device 20 is operating (blocks 156, 160). In addition, the base metering device 20 causes the people meter 28 to perform any of a variety of prompting methods for causing the household members 34 to provide information about their identities and about whether the household members 34 are located within the viewing area 30 (block 158). The sets of viewing data collected by the portable metering device 22 and the base metering device 20 are both transported to the central data collection facility 42 via any of the communication interfaces 56, 76 adapted to enable communication with the central data collection facility 42 (blocks 152, 162). At the central data collection facility 42, the set of viewing data provided by the portable metering device 22 and the set of viewing data provided by the portable metering device 22 are compared and identified as being associated with a single viewing event performed by a single person (blocks 166, 168). The data sets may also be compared to identify possible errors in the data (block 170).

Alternatively, the methods 144 described above, may be performed such that instead of the base metering device 20 causing the people meter 28 device to prompt household members 34 for information, the method 144 may rely upon signals provided by the identification tags 24 carried by the household members 34 located in the viewing area to identify the household members 34. In such an embodiment, the base metering device 20 receives information from all of the identification tags 24 located in the viewing area 30. That information is then stored by the base metering device 20 and used by the base metering device 20 to associate the collected viewing data with the appropriate household member(s).

Figure 8:
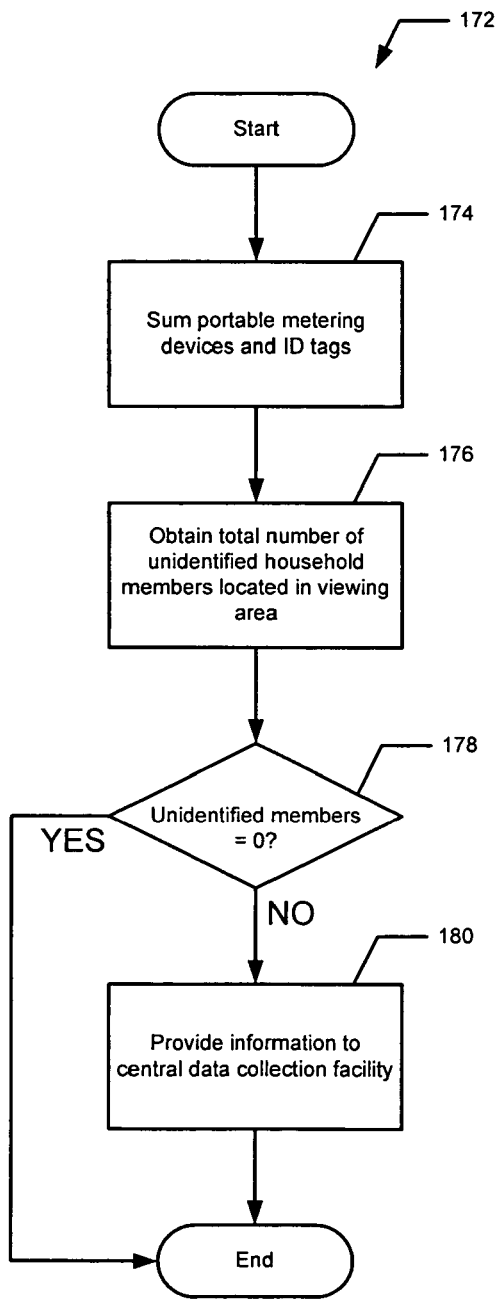
FIG. 8 is a flow diagram representation of another example method to collect audience information associated with a media presentation.

Referring now to FIG. 8, the base metering device 20 may be adapted to determine when one or more household members are located in the viewing area 30 but are not carrying either a portable metering device 22 or an identification tag 24. Prior to performing the method, the base metering device 20 obtains a signal from the audience change detector 26 from which the base metering device 20 determines the number of household members 34 located in the viewing area 30. In addition, the base metering device 20 detects the number of portable metering devices 22 and the number of identification tags 24 located in the viewing area 30. This information, once obtained by the base metering device 20, is used as input for a method 172 that may begin at a block 174 at which the base metering device 20 adds the total number of portable metering devices 22 located in the viewing area 30 to the total number of identification tags 24 located in the viewing area 30 to obtain a total number of identified household members located in the viewing area (block 174). The total number of identified household members located in the viewing area 30 is then subtracted from the number of household members located in the viewing area 30 as determined from the information provided by the audience change detector 26 thereby resulting in a total number of unidentified household members located in the viewing area (block 176). If the total number of unidentified household members is equal to zero, determined at a block 178, then the base metering device 20 need not perform any additional processing related to determining viewer identities as all viewer identities are known from the signals received by the base metering device 20, the portable metering devices 22 and the identification tags 24. If, instead, the total number of unidentified household members is greater than zero, then the base metering device 20 may be adapted to inform the central data collection facility 42 of the number of unidentified household members located in the viewing area 30, the time during which the unidentified household members were located in the viewing area 30, the programming that was displayed by the television 14 during the aforementioned time, and the identities of any household members not included among a list of household members identified by one of the identification signals received by the base metering device 20 from one of the portable metering devices 22 and/or identification tags 24 by located in the viewing area 30 (block 180).

In a further embodiment, the base and portable metering devices 20, 22 may be configured to provide interactive feedback collected from a viewer of the media presentation to the central data collection facility 42. For example, a product and/or service company may provide polling queries associated with an advertisement for that product and/or service company to the central data collection facility 42 which in turn, may communicate the polling queries to the metering device (i.e., the base metering device 20 and/or the portable metering device 22). The product and/or service company may upload the polling queries to the central network via the Internet and/or any other suitable connection. In response to detection of the source identifier (SID) associated with the product and/or service company, the metering device may generate polling queries on the display. Information provided to the central data collection facility 42 by the metering device may include responses of the viewer to queries generated by the metering device information used by the viewer to change the settings of the metering device, or expressions of like or dislike of a media presentation that the viewer is consuming in response to polling queries from the source of the media presentation. That is, a viewer of a television program may provide an opinion regarding the content of the television program. As a result, the metering device may transmit information associated with the viewer and the media presentation, and interactive feedback by the viewer associated with the media presentation to the central data collection facility 42 for processing such data.

Figure 9:
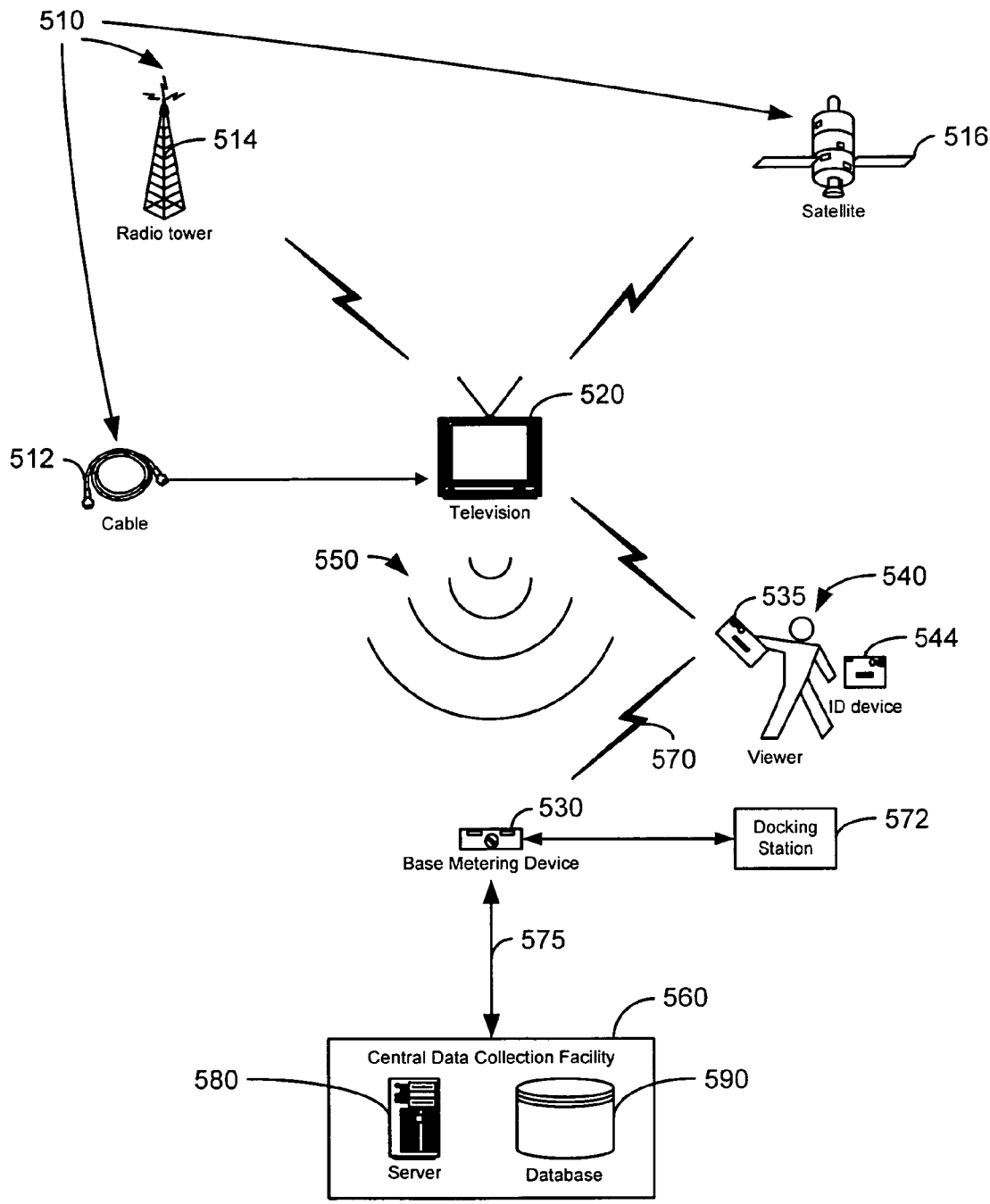
FIG. 9 is a block diagram representation of another example television system.

Referring to FIG. 9, the metering devices described above may operate in conjunction with each other to collect audience information associated with a media presentation. The example television system 500 of FIG. 9 includes a television provider 510, a television 520, a base metering device 530, and a portable metering device 535. The television service provider 510 may be any television service provider such as, but not limited to, a cable television service provider 512, a radio frequency (RF) television provider 514, and/or a satellite television service provider 516. The television 520 may be any suitable television configured to emit an audio component and a video component of a media presentation such as, but not limited to, a program, an advertisement, a video game, and/or a movie preview. The base metering device 530 may be the metering device 20 shown in FIG. 2, and the portable metering device 535 may be the metering device 22 shown in FIG. 3 (i.e., one of the cellular telephone, the PDA, or the handheld computer). The base metering device 530 and the portable metering device 535 may be in communication with each other via a first communication link 570 such as a hardwire link and/or a wireless link. For example, a docking station 572 may be configured to hold and communicatively couple the portable metering device 535 to the base metering device 530 via a universal serial bus (USB) port. Accordingly, the base metering device 530 and the portable metering device 535 may be in communication with each other. Further, the base metering device 530 may be in communication with a central data collection facility 560 via a second communication link 575 such as a hardwire link and/or a wireless link. The central data collection facility 560 may include a server 580 and a database 590.

Figure 10:
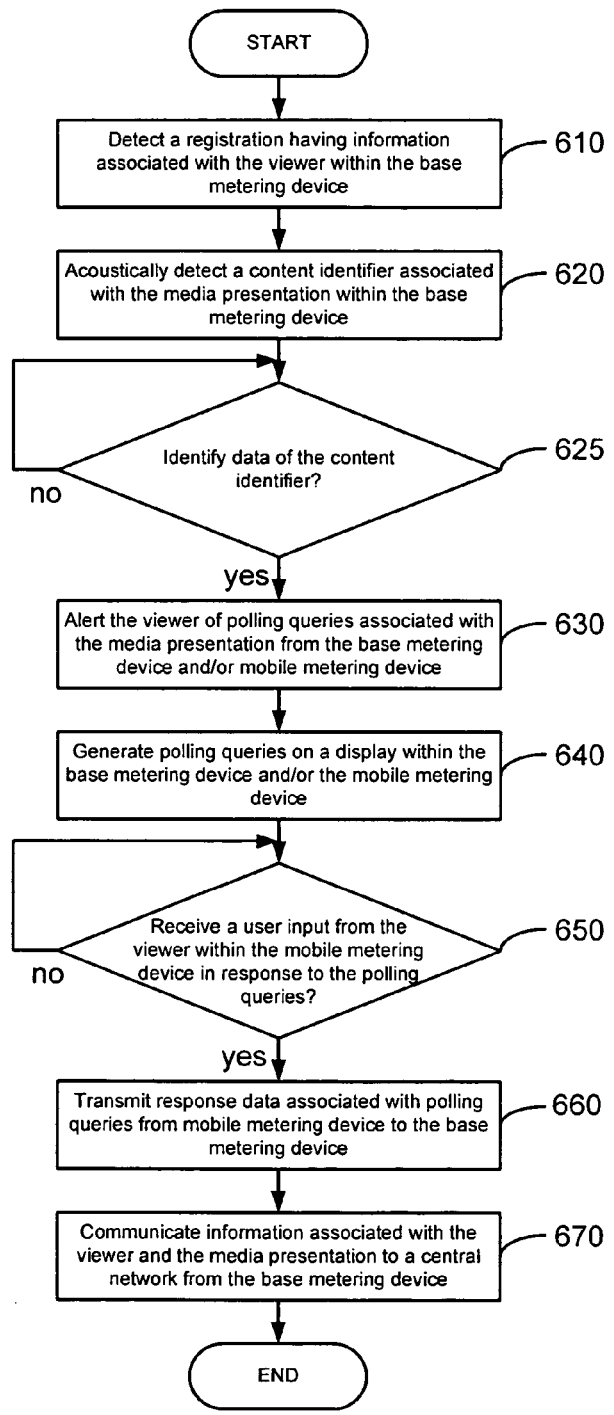
FIG. 10 is a flow diagram representation of an alternative machine readable instructions which may be executed to collect audience information associated with a media presentation.

Example machine readable instructions which may be executed by the base metering device 530 and the portable metering device 535 are represented in a flow chart in FIG. 10. In the illustrated example, the base metering device 530 first detects a registration including information associated with a viewer 540 from the portable metering device 535, a tuning device or a remote control device (e.g., one shown as 16 in FIG. 1), and/or an identification device 544 (e.g., an ID tag or a cellular telephone) (block 610). For example, the viewer 540 may manually register with the base metering device 530 using either the portable metering device 535 or the tuning device. Alternatively, the viewer 540 may automatically register with the metering device 535 via the identification device 544.

Upon receiving the registration, the base metering device 530 attempts to detect a content identifier 550 associated with a media presentation as described above (block 620) and identify the content identifier 550 (block 625). After a content identifier is detected and identified, the base metering device 530 and/or the portable metering device 535 alerts the viewer 540 to respond to polling queries (block 630). For example, the base metering device 530 and/or the portable metering device 535 may draw the attention of the viewer 540 with an audio alert, a visual alert, and/or a vibrational alert. The visual alert may be an LED that is green, red, blue or any other suitable color. The visual alert may also be any suitable device that produces a visual signal to draw the attention of the viewer 540. The audio alert may be a piezoelectric device, a speaker or any other suitable device that generates an audible signal to draw the attention of the viewer 540. The vibrational alert may be embodied in any well known vibration devices such as those used in conventional cellular telephones and/or pagers. The base metering device 530 and/or the portable metering device 535 may use any or all of the visual alert, audio alert, and vibrational alert to draw the attention of the viewer 540. When a media presentation requires a consumer interaction, for example, the base metering device 530 and/or the portable metering device 535 may prompt the viewer 540 to disconnect the portable metering device 535 from the docking station 572. The viewer 540 may then remove the portable metering device 535 from the docking station 572 to respond to the polling queries. Accordingly, the base metering device 530 and/or the portable metering device 535 generates the polling queries on a display disposed in or otherwise associated with the base metering device 530 and/or the portable metering device 535 (block 640). The portable metering device 535 may receive an input via a user interface (e.g., one shown as 88 in FIG. 3) in response to the polling queries (block 650).

The portable metering device 535 transmits response data associated with the polling queries by the viewer 540 to the base metering device 530 via the second communication link 575 (block 660). After receipt of the response data, the base metering device 530 communicates information associated with the viewer and the media presentation to a central data collection facility 560 for collecting such data via the first communication link 570 (block 670).

Figure 11:
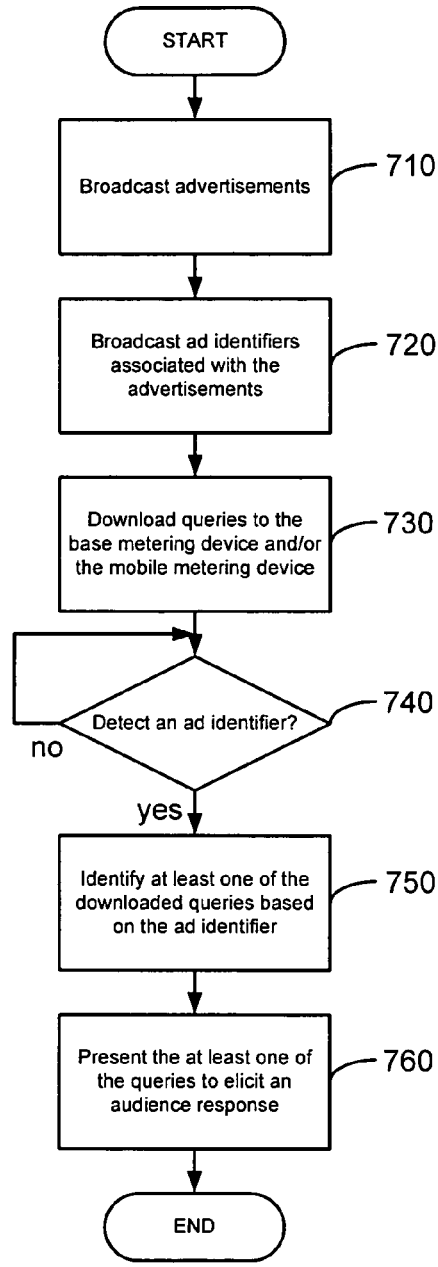
FIG. 11 is a flow diagram representation of an alternative machine readable instructions which may be executed to collect audience information associated with a media presentation.

Another example machine readable instructions which may be executed by the base metering device 530 and the portable metering device 535 are represented in a flow chart in FIG. 11. In the illustrated example, the television 520 broadcasts advertisements of a product and/or a service company, an organization, and/or any other entities to a consumer (block 710). The television 520 also broadcasts an ad identifier such as the SID described above with each advertisement (block 720). For the example, a soft drink company may embed a corresponding SID in an advertisement for a soft drink produced by the company. Further, the company may upload queries such as, but not limited to, survey questions associated with the advertisement to the central data collection facility 560 via the Internet. Then, the ad identifier and the queries are downloaded to the base metering device 530 and/or the portable metering device 535 (block 730). Alternatively, the base metering device 530 and/or the portable metering device 535 may retrieve such data from the central data collection facility 560. The base metering device 530 attempts to detect the ad identifier (block 740). Based on the ad identifier, the base metering device 530 and/or the portable metering device 535 identifies at least one survey question associated with the advertisement (block 750), and presents the at least one survey question to the consumer (block 760). Of course, in this embodiment, the base metering device 530 and/or portable metering device 535 are programmed with information that the respective metering device uses to associate the ad identifier with the appropriate survey question(s). Such information may be provided, for example, in a database format. Further, the base metering device 530 may be adapted to receive the database 590 from the central data collection facility 560 and to transmit the database 590 to the portable metering device 535 via the docking station 572 or via a wireless communication link using one or more of the appropriate communication interfaces installed in each device.

The methods and apparatus disclosed herein are particularly well suited for use with a television. However, the teachings of the disclosure may be applied to other electronic devices media presentation devices, such as a personal computer, a radio, or any other device capable of presenting media programming, without departing from the scope or spirit thereof. In addition, although the audience measurement system described herein is disclosed as being used to meter viewing of a television relative to a viewing area located within a household, the system may be used to meter viewing that occurs at any location. Thus, the household members described with respect to the household may instead be office workers and the system may be used to meter their viewing habits relative to an office.

Although certain example methods, apparatus, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. A method of collecting media exposure data comprising:
    monitoring by a first media metering device associated with a media presentation device for a physical presence of one or more other media metering devices; and
    halting a media monitoring operation of the first media metering device when the physical presence of the one or more other media metering devices is detected by the first metering device.

2. A method as defined in claim 1, wherein the first media metering device is a base metering device and the one or more other media metering devices are portable media metering devices.

3. A method as defined in claim 2, wherein the base metering device includes hardware communication circuitry for coupling the base metering device with a media presentation device to monitor media content presented by the media presentation device.

4. A method as defined in claim 2, wherein the one or more portable metering devices are wearable by a person and include wireless communication hardware for communication with the base metering device.

5. A method as defined in claim 1, further comprising emitting by the first media metering device a signal to cause the one or more other media metering devices to identify collected data as data associated with media exposure within a monitored location.

6. A method as defined in claim 5, wherein the signal emitted by the first media metering device comprises at least one of a continuously emitted signal or a periodically emitted signal.

7. A method as defined in claim 5, wherein the data associated with the media exposure within the monitored location comprises in-home data.

8. A tangible machine accessible medium having instructions stored thereon that when executed, cause a machine to at least:
monitor for a physical presence of one or more other media metering devices via a first media metering device associated with a media presentation device; and
halt a media monitoring operation of the first media metering device when the physical presence of the one or more other media metering devices is detected by the first metering device.

9. A machine accessible medium as defined in claim 8, wherein the first media metering device is a base media metering device and the one or more other media metering devices are portable media metering devices.

10. A machine accessible medium as defined in claim 8, wherein the instructions, when executed, cause the machine to emit by the first media metering device a signal to cause the one or more other media metering devices to identify collected data as data associated with media exposure within a monitored location.

11. An apparatus for collecting media exposure data comprising:
a sensor to monitor for a physical presence of one or more media metering devices; and
a processor to halt a media monitoring operation when the physical presence of the one or more other media metering devices is detected by the sensor.

12. An apparatus as defined in claim 11, wherein the processor is configured to halt monitoring activity in response to detecting the physical presence of the one or more other media metering devices.

13. An apparatus as defined in claim 11 further comprising a communication interface configured to emit a signal to cause the one or more media metering devices to identify collected data as data associated with media exposure within a monitored location.

14. An apparatus for collecting media exposure data comprising:
means for monitoring for the physical presence of one or more media metering devices; and
means for halting a media monitoring operation when the physical presence of the one or more media metering devices is detected by the first metering device.

15. An apparatus as defined in claim 14, further comprising means for emitting a signal to cause the one or more media metering devices to identify collected data as data associated with media exposure within a monitored location.

* * * * *